United States Patent Office 3,405,179
Patented Oct. 8, 1968

3,405,179
METHOD OF PREPARING ARYLBORANE COMPOUNDS
Anatole Wowk, Rahway, N.J., assignor to M & T Chemicals Inc., New York, N.Y., a corporation of Delaware
No Drawing. Filed Nov. 8, 1963, Ser. No. 322,515
15 Claims. (Cl. 260—606.5)

*Improved Process*

This invention relates to a novel process for preparing arylborane compounds.

Arylborane compounds, typified by triphenylborane ($\phi_3$B) are high energy compounds which may be used as fuels, fuel additives, propellants, and the like. Uses of these compounds, however, have been limited by the lack of a practical, convenient method for preparing them.

The most serious deficiency in prior art techniques lies in the procedure for separating and purifying the triarylborane. For example, it is common to distill triphenylborane from a reaction mixture which may initially include diethyl ether, magnesium salts (including etherates), biphenyl, and other by-products. The distillation of triphenylborane from such a mixture may be complicated and troublesome. The product compound has a high melting point—typically about 140° C. Therefore, the pot temperature and the entire distillation system must be maintained above this temperature and typically as high as 200° C.–300° C. to prevent undesired solidification, and the necessarily high temperatures may cause degradation of product. The magnesium salts may typically cause foaming, bumping and poor heat transfer in the pot, thereby preventing complete distillation of product. Furthermore, the entire distillation must be conducted under an inert atmosphere to prevent the reaction of product with oxygen at the high temperatures employed. Because of these problems, excessive loss of product may occur and yields may be greatly reduced to a level of not more than 30%–35%.

It is an object of this invention to provide a novel process for the preparation of triarylborane compounds. It is a further object to provide a novel process for recovering high purity triarylborane componds. Other objects will become apparent to those skilled in the art upon inspection of the following disclosure.

In accordance with certain of its aspects, this invention relates to the process for preparing triarylborane which comprises the steps of (1) reacting aryl Grignard reagent selected from the group consisting of arylmagnesium bromide and arylmagnesium iodide with boron halide in the presence of organic ether thereby forming product mixture of triarylborane and magnesium halide etherate; (2) adding to said product mixture inert hydrocarbon solvent in which said triarylborane is soluble and magnesium halide is substantially insoluble; (3) heating and stripping said organic ether from said product mixture thereby cleaving said magnesium halide etherate, precipitating said magnesium halide and dissolving said triarylborane in said inert hydrocarbon solvent thereby forming a solution; and (4) separating triarylborane solution from said magnesium halide thereby recovering said triarylborane as a solution in said inert hydrocarbon solvent.

The process for preparing triarylborane compounds according to this invention may comprise, as a first step, the reaction of an aryl Grignard reagent with a boron halide in the presence of an organic ether. The aryl Grignard reagent may typically be represented by the structure ArMgX wherein Ar may be an aryl radical and X may be selected form the group consisting of bromide and iodide. Thus, Ar may be phenyl, tolyl, xylyl, ethylphenyl, naphthyl, etc. Preferably Ar may be a monocyclic aryl and most preferably it may be phenyl. Most preferably, X may be bromide. Typical aryl Grignard reagents may include phenylmagnesium bromide, tolylmagnesium bromide, phenylmagnesium iodide, naphthyl magnesium bromide, xylylmagnesium iodide, ethylphenylmagnesium bromide, etc. The aryl Grignard reagent may have been prepared by the reaction of magnesium with an aryl bromide or iodide, preferably in the presence of an organic ether solvent. When so prepared, the aryl Grignard reagent may be employed as a solution of Grignard etherate. Aryl Grignard tetrahydrofuran etherates in tetrahydrofuran solution may be highly preferred.

The boron halide employed may commonly and typically be represented by the structure $BY_3$ wherein Y may be a halide, typically selected from the group consisting of fluoride, chloride, bromide, and iodide. All the Y's need not be the same. Preferably, Y may be fluoride. The boron halide may be employed as the halide, per se or as a boron halide complex, typically a boron halide etherate. Typical boron halide reactants may include boron trifluoride, boron trichloride, boron tribromide, boron triiodide, boron dibromide iodide, boron trifluoride diethylether etherate, boron trifluoride tetrahydrofuran etherate, boron trifluoride dioxane etherate, etc. Boron trifluoride and etherates thereof may be preferred. Preferably, the boron halide may be freshly purified, as by distillation.

Preferably, the boron halide and the aryl Grignard reagent may be reacted in substantially stoichiometric amounts, e.g., three moles of aryl Grignard per mole of boron halide. Substantial excesses of Grignard may cause undesirable formation of tetraaryllboron compounds. Deficiencies of Grignard may lead to the presence of diarylboron halides which may be difficult to remove from the product.

The reaction between the aryl Grignard reagent and the boron halide may preferably take place in the presence of an organic ether as a reaction solvent and/or diluent. Organic ethers which may be employed in the practice of this invention may typically have the structure R—O—R', wherein R and R' may be alkyl radicals which may, if desired, be joined through carbon atoms or hetero (e.g., nitrogen or oxygen) atoms to form a cyclic ether preferably having a ring of 5–6 atoms. Typically, the organic ether may be the same as that used in the preparation of the aryl Grignard reagent. The organic ethers employed will preferably have boiling points at atmospheric pressure of less than 180° C. and preferably less than 140° C.

Typical useful organic ethers may include diethyl ether, dibutyl ether, dioxane, tetrahydrofuran, tetrahydropyran, 2-methyltetrahydrofuran, 2-ethoxytetrahydropyran, tetrahydrofurfuryl ethyl ether, dihydropyran, N-ethylmorpholine, etc. The preferred organic ether may be tetrahydrofuran. The organic ether may typically be employed in the amount of 2 to 10 moles per mole, of aryl Grignard reagent. Preferably it may be present in the amount of 2–5, say 3 moles per mole of Grignard.

Reaction of the aryl Grignard reagent with the boron halide may be effected by mixing the two reactants in the presence of the organic ether. The reaction may typically be exothermic and the exotherm may be controlled by adding one of the reactants incrementally, by use of a cooling bath, etc. Preferably, the boron halide may be dissolved in the organic ether and the aryl Grignard reagent in ether solution may be added thereto incrementally at a rate sufficient to maintain a temperature of about 20–40° C. Typically, the addition may be made over a period of about 1–3, say 2 hours.

The reaction may be rapid and substantially quantitative. It may be substantially complete at the end of the addition period, but further time, typically about 2 hours at 20–50° C. may be allowed to ensure a maximum yield of product.

The product mixture from the reaction of the boron halide and the aryl Grignard reagent may include triarylborane; magnesium halide, typically present as etherate; and minor amounts of byproducts, typically including biphenyl, etc. Typically, these products may be partially or wholly dissolved in the organic ether.

In accordance with the practice of this invention triarylborane may be recovered from the product mixture by adding thereto an intert hydrocarbon solvent in which the triarylborane is soluble and the magnesium halide is substantially insoluble.

The intert hydrocarbon solvent which may be employed in this invention may typically be a solvent in which the triarylborane is soluble and the magngesium halide is substantially insoluble. Preferably, the intert hydrocarbon solvent may have a boiling point at the pressure of operation, preferably atmospheric pressure, which boiling point is at least equal to and preferably higher than the decomposition temperature of the magnesium halide etherate complex. These decomposition temperatures may depend upon the particular etherate complex, and typically they may be about 90°–180° C., say 130–160° C. The intert hydrocarbon solvent should also have a higher boiling point than the organic ethers employed.

Typical inert hydrocarbon solvents which may be employed may include aromatic hydrocarbons such as xylene, mesitylene, ethylbenbene, n-propylbenzene, cumene, etc.; aliphatic hydrocarbons such as octane, nonane, decane, high-boiling petroleum fractions, etc.; cycloaliphatic hydrocarbons such as 1,3-dimethylcyclohexane, p-menthane; etc. The preferred inert hydrocarbon solvent may be compounds which are free of non-aromatic unsaturation, typically alkanes and aryl compounds. The preferred inert hydrocarbon solvent may be xylene which may be used as a single isomer or as a mixture of isomers.

The amount of inert hydrocarbon solvent which may be added to the product mixture may typically be greater in volume than the total volume of the organic ether in the product mixture. Lesser amounts may be employed, but substantially smaller amounts, e.g., amounts less than about 100% of the volume of the organic ether may make complete removal of the organic ether difficult. Larger amounts may also be employed, but amounts in excess of about 400% by volume of the organic ether may unnecessarily dilute the triarylborane. Preferably, the amount of inert hydrocarbon solvent added may be about 150–250%, say 200% by volume of the total volume of organic ether in the product mixture. Preferably, the inert hydrocarbon solvent may be added in increments, say six equal increments, and stripping of the organic ether, as hereinafter set forth, may be maintained between and during the additions.

After the addition of at least a portion of the inert hydrocarbon solvent, the mixture may be heated, typically at atmospheric pressure, thereby distilling free ether present in the product mixture. As the organic ether is removed, the pot temperature may gradually increase until the decomposition temperature of the etherate complex is reached. At this decomposition temperature, which may be about 90–180° C., say 130–160° C., the magnesium halide etherate complex may be cleaved, and solid magnesium halide may be precipitated from solution. Stripping may be continued until substantially all of the organic ether is removed and the pot temperature approximates the boiling point of the inert hydrocarbon solvent.

When the removal of the organic ether is substantially complete substantially all of the product triarylborane may be in solution in the inert hydrocarbon solvent, and substantially all of the magnesium halide may be precipitated. The solution of the triarylborane may then be physically separated from the magnesium halide by filtration, decanting, centrifuging, etc.

Triarylborane may then be recovered in solid form by stripping the inert hydrocarbon solvent, preferably under vacuum at moderate temperatures, say 40–75° C. If desired, the triarylborane may be further purified by extraction and recrystallization with a suitable solvent. The lower alkanes have been found to be highly preferred selective solvents for the extraction and recrystallization of triarylboranes because they give good separation of triarylborane from impurities present in the solid cake and yield crystalline triarylborane of high purity. A preferred lower alkane may be n-hexane.

Practice of specific embodiments of this novel process may be observed from the following illustrative example.

140 grams (0.986 mole) of freshly distilled boron trifluoride ethyl etherate was added to a nitrogen-flushed flask and 100 cc. of tetrahydrofuran was added thereto with stirring and cooling. 537 grams (2.96 moles) of phenylmagnesium bromide in 835 cc. of tetrahydrofuran was added slowly to the reaction flask over a period of 120 minutes, during which time the reaction mixture was maintained at 25–35° C. by means of a running water bath. Transfer of the phenylmagnesium bromide was completed by washing it in with 150 cc. of tetrahydrofuran and 200 cc. of xylene. When the addition was complete, the mixture was stirred for an additional 2 hours at 35–45° C.

The product mixture, containing triphenylborane, magnesium bromide fluoride etherate, ethyl ether, and tetrahydrofuran was placed in a distillation apparatus and distillation (with stirring) at atmospheric pressure was commenced. During the distillation, inert hydrocarbon solvent xylene was added in 6 increments of 200 cc. each. When the pot temperature reached 137° C, cleavage of the magnesium halide etherate occurred and solid magnesium halide was precipitated. Distillation was continued until substantially all of the ether was removed, at which point the total distillate amounted to 1680 cc. An additional 550 cc. of xylene was added at the end of the distillation.

The xylene solution containing triphenylborane was decanted from the solid residue and the residue was leached with an additional 150 cc. of warm xylene. The combined xylene solutions were then stripped under vacuum to give 233 grams of crude solid product. Extraction and recrystallization from n-hexane gave 131.0 grams (55%) of triphenylborane of high purity. Analysis showed 4.36% boron (4.47% theory).

It will be apparent from an inspection of this example that practice of this invention avoids the undesirable high-temperature distillations which are required by prior art processes. Moreover, the process of this invention gives high yields of very pure product. Other boron halides, aryl Grignard reagents, organic ethers and inert hydrocarbon solvents, hereinbefore described, may also be employed to permit attainment of similar advantages.

Although this invention has been illustrated by reference to specific examples, numerous changes and modifications thereof which clearly fall within the scope of the invention will be apparent to those skilled in the art.

I claim:

1. The process for preparing triarylborane which comprises (1) reacting an aryl Grignard reagent selected from the group consisting of arylmagnesium bromide and arylmagnesium iodide with boron fluoride in the presence of organic ether thereby forming product mixture of triarylborane and magnesium fluoride etherate; (2) adding to said product mixture inert hydrocarbon solvent in which said triarylborane is soluble and said magnesium fluoride is substantially insoluble, said inert hydrocarbon solvent having a boiling point which is higher than the decomposition temperature of said magnesium fluoride etherate; (3) heating and stripping said organic ether from said product mixture thereby cleaving said magnesium fluoride etherate, precipitating said magnesium fluoride, and dissolving said triarylborane in said inert hydrocarbon solvent thereby forming a solution; and (4) separating triarylborane solution from said magnesium fluoride thereby recovering said triarylborane as a solution in said inert hydrocarbon solvent.

2. The process for preparing triarylborane compounds as claimed in claim 1 wherein the aryl Grignard reagent is phenyl Grignard reagent.

3. The process for preparing triarylborane compounds as claimed in claim 1 wherein the boron fluoride is boron trifluoride.

4. The process for preparing triarylborane compounds as claimed in claim 1 wherein the mole ratio of aryl Grignard reagent to boron fluoride is about 3:1.

5. The process for preparing triarylborane compounds as claimed in claim 1 wherein the organic ether is tetrahydrofuran.

6. The process for preparing triarylborane compounds as claimed in claim 1 wherein the inert hydrocarbon solvent has a boiling point of 130–160° C.

7. The process for preparing triarylborane compounds as claimed in claim 1 wherein the inert hydrocarbon solvent is xylene.

8. The process for preparing triphenylborane which comprises (1) reacting phenylmagnesium bromide with boron fluoride in the presence of organic ether thereby forming product mixture of triphenylborane and magnesium fluoride etherate; (2) adding to said product mixture inert hydrocarbon solvent in which said triphenylborane is soluble and in which said magnesium fluoride is substantially insoluble, said inert hydrocarbon solvent having a boiling point which is higher than the decomposition temperature of said magnesium fluoride etherate; (3) heating and stripping said organic ether from said product mixture, thereby cleaving said magnesium fluoride etherate, precipitating said magnesium fluoride, and dissolving said triphenylborane in said inert hydrocarbon solvent thereby forming a solution; and (4) separating the triphenyl-borane solution from said magnesium flouride thereby recovering said triphenylborane as a solution in said inert hydrocarbon solvent.

9. The process for preparing triphenylborane as claimed in claim 8 wherein the organic ether is tetrahydrofuran.

10. The process for preparing triphenylborane as claimed in claim 8 wherein the inert hydrocarbon solvent is xylene.

11. The process for preparing triphenylborane as claimed in claim 8 wherein the amount of inert hydrocarbon solvent added is 100%–400% by volume of the total volume of organic ether in the product mixture.

12. The process for preparing triphenylborane which comprises the steps of (1) reacting phenylmagnesium bromide with boron fluoride in the presence of organic ether, thereby forming product mixture triphenylborane and magnesium fluoride etherate; (2) adding to said product mixture inert hydrocarbon solvent having a boiling point of 130–160° C. said inert hydrocarbon solvent being added in the amount of 100–400% by volume of the total volume of organic ether in said product mixture; (3) heating and stripping said organic ether from said product mixture until the pot temperature approximates the boiling point of the inert hydrocarbon solvent thereby cleaving said magnesium fluoride etherate, precipitating said magnesium fluoride and dissolving said triphenylborane in said inert hydrocarbon solvent thereby forming a solution; and (4) separating the triphenylborane solution from said magnesium fluoride; (5) stripping the inert hydrocarbon solvent from the solution, thereby forming a solid cake containing triphenylborane; and (6) extracting said cake with a lower alkane and recrystallizing therefrom triphenylborane of high purity.

13. The process for preparing triphenylboron as claimed in claim 12 wherein the lower alkane is n-hexane.

14. In the process for preparing triarylborane by reacting boron fluoride and an aryl Grignard reagent in the presence of organic ether to form as product mixture triarylborane and magnesium fluoride etherate, the improvement which comprises: (1) adding to said product mixture an inert hydrocarbon solvent in which said triarylborane is soluble and the magnesium fluoride is substantially insoluble, said inert hydrocarbon solvent having a boiling point which is higher than the decomposition temperature of said magnesium fluoride etherate; (2) heating and stripping said organic ether from said product mixture thereby cleaving said magnesium fluoride etherate, precipitating said magnesium fluoride and dissolving said triarylborane in said inert hydrocarbon solvent, thereby forming a solution; and (3) separating the triarylborane solution from said magnesium fluoride, thereby recovering said triarylborane as a solution in said inert hydrocarbon solvent.

15. The process for separating triarylborane from a mixture containing triarylborane, magnesium fluoride etherate and organic ether which comprises (1) adding to said mixture an inert hydrocarbon solvent in which said triarylborane is soluble and the magnesium fluoride is substantially insoluble, said inert hydrocarbon solvent having a boiling point which is higher than the decomposition temperature of said magnesium fluoride etherate; (2) heating and stripping said organic ether from said mixture thereby cleaving said magnesium fluoride etherate, precipitating said magnesium fluoride and dissolving said triarylborane in said inert hydrocarbon solvent thereby forming a solution; and (3) separating the triarylborane solution from said magnesium fluoride, thereby recovering said triarylborane as a solution in said inert hydrocarbon solvent.

References Cited
UNITED STATES PATENTS

| | | | |
|---|---|---|---|
| 2,853,525 | 9/1958 | Wittig et al. | 260—606.5 |
| 3,109,851 | 11/1963 | Ramsden | 260—606.5 X |

OTHER REFERENCES

Lappert: "Chem. Reviews," volume 56, No. 5, 1956, pp. 1026–1027.

Krause et al.: "Ber.," vol. 55, 1922, pp. 1261 to 1265.

TOBIAS E. LEVOW, *Primary Examiner.*

W. F. W. BELLAMY, *Assistant Examiner.*